(12) United States Patent
Adler

(10) Patent No.: US 7,254,633 B2
(45) Date of Patent: Aug. 7, 2007

(54) PROBABILISTIC PACKET MARKING

(75) Inventor: Micah Adler, Amherst, MA (US)

(73) Assignee: University of Massachusetts Amherst, Amherst, MA (US)

( * ) Notice: Subject to any disclaimer, the term of this patent is extended or adjusted under 35 U.S.C. 154(b) by 853 days.

(21) Appl. No.: 10/358,123

(22) Filed: Feb. 4, 2003

(65) Prior Publication Data

US 2003/0149777 A1     Aug. 7, 2003

Related U.S. Application Data

(60) Provisional application No. 60/355,271, filed on Feb. 7, 2002.

(51) Int. Cl.
  *G06F 15/173* (2006.01)
  *G06F 12/16* (2006.01)
(52) U.S. Cl. .......................... 709/224; 726/23
(58) Field of Classification Search ................ 709/229, 709/235, 224; 726/13, 22–25
  See application file for complete search history.

(56) References Cited

U.S. PATENT DOCUMENTS

| | | | |
|---|---|---|---|
| 6,725,378 B1 * | 4/2004 | Schuba et al. ................. | 726/13 |
| 6,886,102 B1 * | 4/2005 | Lyle ............................ | 726/23 |
| 6,971,028 B1 * | 11/2005 | Lyle et al. ..................... | 726/25 |
| 7,043,759 B2 * | 5/2006 | Kaashoek et al. ............ | 726/25 |
| 7,047,303 B2 * | 5/2006 | Lingafelt et al. ............ | 709/229 |
| 2001/0014093 A1 * | 8/2001 | Yoda et al. .................. | 370/389 |
| 2002/0107960 A1 * | 8/2002 | Wetherall et al. ........... | 709/225 |
| 2002/0120853 A1 * | 8/2002 | Tyree ........................... | 713/188 |
| 2003/0009554 A1 * | 1/2003 | Burch et al. ................. | 709/224 |
| 2003/0036970 A1 * | 2/2003 | Brustoloni ................... | 705/26 |
| 2003/0172289 A1 * | 9/2003 | Soppera ...................... | 713/200 |

FOREIGN PATENT DOCUMENTS

| | | |
|---|---|---|
| WO | 01/59584 | 8/2001 |
| WO | 02/03653 | 1/2002 |

OTHER PUBLICATIONS

Micah Adler. Tradeoffs in Probabilistic Packet Marking for IP Traceback. In *Proc. Of ACM Symposium on Theory of Computing,*, Aug. 29, 2002.

Micah Adler. Tradeoffs in Probabilistic Packet Marking for IP Traceback. Seminar at the University of Massachusetts, Amherst, Sep. 25, 2001.

Micah Adler. Tradeoffs in Probabilistic Packet Marking for IP Traceback TITLE2. University of Massachusetts, Amherst: Jul. 2001.

(Continued)

*Primary Examiner*—George C. Neurauter, Jr.
(74) *Attorney, Agent, or Firm*—Fish & Richardson P.C.

(57) ABSTRACT

A method for probabilistic packet marking in a network includes encoding Internet Protocol (IP) traceback information using b bits located in a packet header. The IP traceback information includes information on an IP traceback path back to a source system and a count of each type of packet. The method also includes forming the IP traceback path as packets are received by a destination system and completing the traceback path after a determined number of packets are received by the destination system.

43 Claims, 4 Drawing Sheets

OTHER PUBLICATIONS

Micah Adler. Tradeoffs in Probabilistic Packet Marking for IP Traceback. Seminar at Brandeis University, Oct. 4, 2001.

Sigal Ar et al. Reconstructing Algebraic Functions from Mixed Data. In *Proc of 33rd Annual Symposium on Foundations of Computer Science*, pp. 503-512, Oct. 1992.

Bellovin, S.M. ICMP Traceback Messages. Internet Draft: draft belovin-itrace-00.txt, Mar. 2000.

Todd Bennett et al. Distributed Denial of Service Attacks. *Oven Digital*, Feb. 2000.

Hal Burch et al. Tracing Anonymous Packets to Their Approximate Source. In *Proc. Usenix LISA '00*, 2000.

Drew Dean et al. An Algebraic Approach to IP Traceback. In *Proc. 2001 Network and Distributed System Security Symposium*.

Sven Dietrich et al. Analyzing Distributed Denial of Service Attack Tools: The Shaft Case. In *Proc. 14th Systems Administration Conference, LISA 2000*.

Thomas Doeppner et al. Using router stamping to identify the source of IP packets. In *Proceedings of the 7th ACM Conference on Computer and Communications Security*, pp. 184-189, Athens, Greece, Nov. 2000.

P. Ferguson et al. RFC 2267: Network Ingress Filtering: Defeating Denial of Service Attacks which employ IP Source Address Spoofing. *The Internet Society*, 1998.

Sally Floyd et al. Random Early Detection Gateways for Congestion Avoidance. *IEEE ACM Transactions on Networking*, Aug. 1993.

Gary C. Kessler, Defenses Against Distributed Denial of Service Attacks. SANS Institute Information Security Reading Room: Nov. 2000.

S.C. Lee et al. Tracing the Source of Network Attack: A Technical, Legal and Societal Problem. *Proceedings of the 2001 IEEE*.

Rajeev Motwani et al. *Randomised Algorithms*. Cambridge University Press, New York,NY, 1995.

Kihong Park et al. On the effectiveness of probabilistic packet marking for IP traceback under denial of service attack. In *Proc. IEEE INFOCOM '01*, Aug. 2001.

Kihong Park et al. On the effectiveness of route-based packet filtering for distributed DoS attack prevention in power-law internets. In *Proc.ACM SIGCOMM '01*, Aug. 2001.

Tao Peng. Adjusted Probabilistic Packet Marking for IP Traceback. ARC Special Research Center for Ultra-Broadband Information Networks.Department of Electrical and Electronic Engineering. The University of Melbourne, Victoria, Australia, Dec. 2001.

C. Perkins. IP Mobility Support. RFC 2002, Oct. 1996.

Luigi Rizzo. Effective Erasure Codes for Reliable Computer Communication Protocols. *ACM Computer Communication Review*, vol. 27, n. 2, pp. 24-36, Apr. 1997.

Stefan Savage et al. Network Support for IP Traceback. *IEEE/ACM Transactions of Networking*, pp. 226-236, vol. 9, No. 3, Jun. 2001.

Stefan Savage et al. Practical Network Support for IP Traceback. In *Proceedingsof ACM SIGCOMM 2000*, pp. 295-306, Aug. 2000.

Alex C. Snoeren et al. Hash-based IP Traceback. In *Proc. ACM SIGCOMM 2000*.

Dawn Xiaodong Song et al. Advanced and Authenticated Marking Schemes for IP Traceback, In *Proc. IEEE INFOCOM '01*, 2000.

International Search Report; PCT/US03/03240; May 2, 2003.

* cited by examiner

PROBABILISTIC PACKET MARKING

PRIORITY TO OTHER APPLICATIONS

This application claims priority from and incorporates herein U.S. Provisional Application No. 60/355,271, filed Feb. 7, 2002, and titled "Probabilistic Packet Marking."

TECHNICAL FIELD

This disclosure relates to probabilistic packet marking in network systems.

BACKGROUND

On a network of computers such as the Internet, a denial of service (DoS) attack is an incident in which a user or organization is deprived of the services of a resource they would normally expect to have. Typically, the loss of service is the inability of a particular network service, such as e-mail, to be available or the temporary loss of all network connectivity and services. In the worst cases, for example, a Web site accessed by millions of people can occasionally be forced to temporarily cease operation. Although usually intentional and malicious, a DoS attack can sometimes happen accidentally. A DoS attack is a type of security breach to a computer system that does not usually result in the theft of information or other security loss. However, these attacks can cost the victim a great deal of time and money.

In some cases, to find the attacker, an Internet Protocol (IP) traceback path is constructed. The traceback path is the path from the victim's site back to the attacker's site. It is often useful to learn the path that packets take through the network (e.g., Internet) between sites. This is especially important for dealing with certain DoS attacks, where a source IP is forged. There are other uses as well, including path characterization and detection of asymmetric routes. There are existing path tracing tools, such as traceroute. However, the traceroute is initiated at the attacker's site and is therefore useless to the victim's site. When forwarding packets, routers can, with a low probability, generate a traceback message that is sent along to the destination. With enough traceback messages from enough routers along the path, the traffic source and path can be determined. However, traceback generates additional traffic over the network.

One IP traceback technique is called a probabilistic packet marking (PPM) technique. PPM is the process of setting the bits allocated to IP traceback randomly, and then using this to determine the path of attack. The process of using these bits to store a router ID and a hop count is one example of PPM. In a packet-switching network, a hop is the trip a data packet takes from one router or intermediate point to another in the network. On the Internet (or a network that uses TCP/IP), the number of hops a packet has taken toward its destination (called the "hop count") is kept in the packet header. Every router forwards a packet independently of other routers with some probability, p, that it writes its unique router ID to those bits and sets the hop count to zero. Thus, a probability that the router ID is left unchanged and the hop count is incremented is equal to 1−p. When the attacker is performing a DoS operation on the target system (e.g., victim) by sending a stream of packets along a path, L, if p=(1/L), then after the victim has received L(log(L)) packets, the victim knows the entire traceback path to the attacker.

SUMMARY

In one aspect the invention is a method for probabilistic packet marking in a network. The method includes encoding Internet Protocol (IP) traceback information using b bits located in a packet header. The IP traceback information includes information on an IP traceback path back to a source system and a count of each type of packet. The method also includes forming the IP traceback path as packets are received by a destination system and completing the traceback path after a determined number of packets are received by the destination system.

In another aspect, the invention is an apparatus for probabilistic packet marking in a network. The apparatus includes a memory that stores executable instructions and a processor. The processor executes the instructions to encode Internet Protocol (IP) traceback information using b bits located in a packet header. The IP traceback information includes information on an IP traceback path back to a source system and a count of each type of packet. The processor also executes instructions to form the IP traceback path as packets are received by a destination system and to complete the traceback path after a determined number of packets are received by the destination system.

In still another aspect, the invention is an article that includes a machine-readable medium that stores executable instructions for probabilistic packet marking in a network. The instructions cause a machine to encode Internet Protocol (IP) traceback information using b bits located in a packet header. The IP traceback information includes information on an IP traceback path back to a source system and a count of each type of packet. The instructions also cause a machine to form the IP traceback path as packets are received by a destination system and to complete the traceback path after a determined number of packets are received by the destination system.

One or more of the aspects above contain one or more of the following features. Packets may be sent from the source system to the destination system using a single path, where b=1 and the determined number of packets is a function of $2^{2n}$ packets and where n is a number of bits used to describe the IP traceback path. Packets may be sent from the source system to the destination system using a single path, wherein b=1 and the determined number of packets is a function of $(2+\epsilon)^{2n}$ packets, where n is a number of bits used to describe the IP traceback path and where $\epsilon$ is a constant greater than 0.

Other features include sending packets from the source system to the destination system using a single path, wherein b>1 and the determined number of packets is a function of $bn^2 2^b (2+\epsilon)^{4n/x}$, where x is equal to $2^b$ and where $\epsilon$ is a constant greater than zero and n is a number of bits used to describe the IP traceback path.

Further features include sending packets from the source system to the destination system using a multi-path, where b bits is equal to log(2 k+1) wherein k is the number of paths used by the source system.

Embodiments of the invention can have one or more of the following advantages. The invention enables traceback to occur even when the header bit is one. Thus, a network system using this invention is able to identify attackers more efficiently. Further aspects, features and advantages will become apparent from the following.

DESCRIPTION

Figure 1:
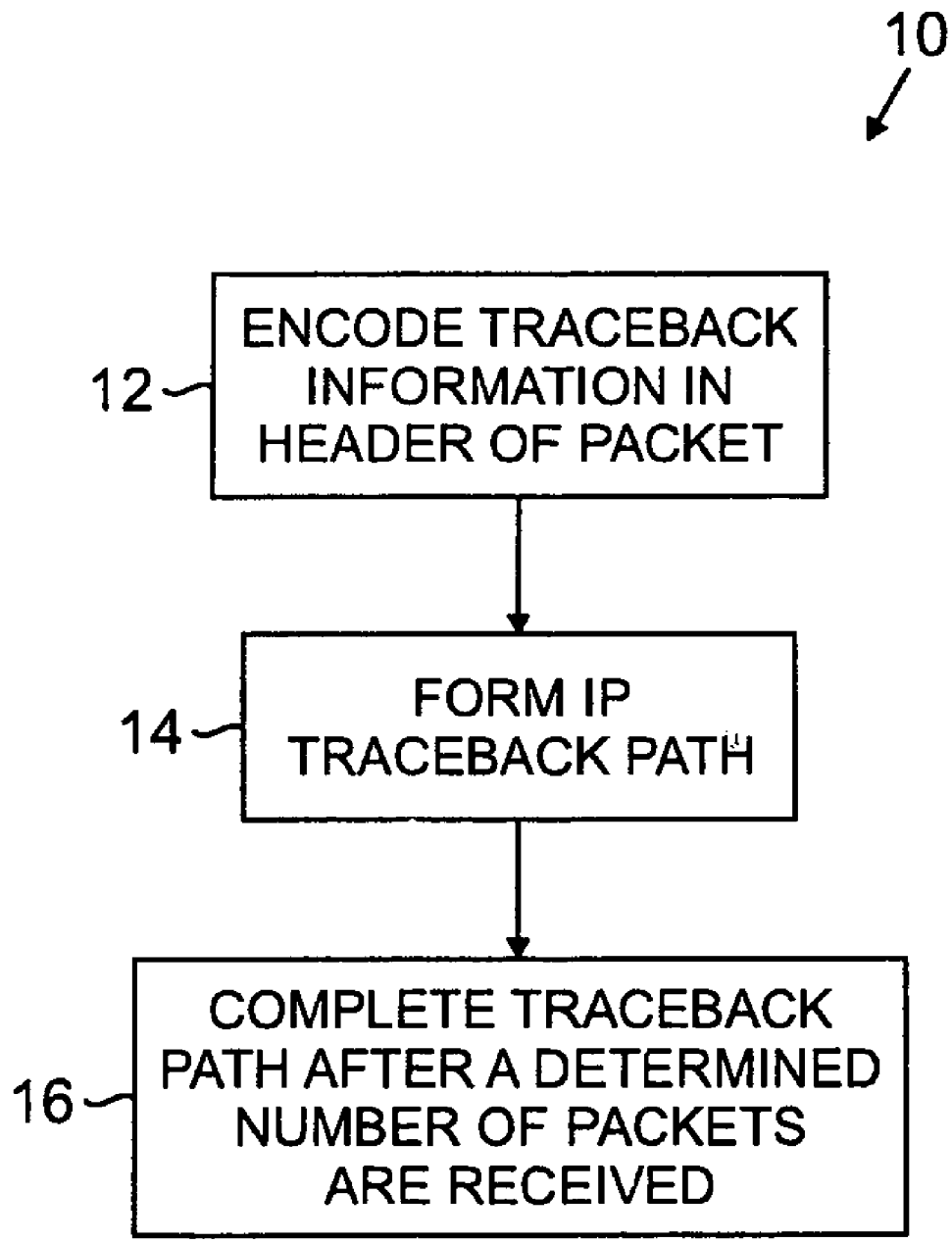
FIG. 1 is a flow diagram of a process for probabilistic packet marking.

Referring to FIG. 1, a network system uses a process 10 to perform traceback in a network is shown. Process 10 encodes (12) traceback information using the bits in a packet header to encode. In networking, a header precedes data or control signals and describes something about a file or transmission unit, such as its length and whether there are other files or transmission units logically or physically associated with this one. Process 10 forms (14) the traceback path as packets are received by a victim's site. Process 10 completes (16) the traceback path after a determined number of packets are received by the victim.

In particular, let b be the number of header bits allocated to IP traceback, and let n be the number of bits required to represent a path of attack. For any protocol with this property, if b<log n then there is some attacker path that can only be correctly identified with probability less than ½. Thus, log n is a lower bound on b for these previous classes of protocols.

The importance of the probabilistic packet marking (PPM) technique described herein is that it allows a path to the attacker to be encoded in such a manner that the victim is able to use the information of how many of each type of packet header the victim receives. Process 10 covers two different scenarios for an Internet Protocol (IP) traceback problem: a case where the attacker sends all of its packets along the same path, and a case where there are multiple paths of attack. For the case of a single path of attack, a new type of PPM technique, which does not belong to the class of protocols described previously, allows for a more efficient encoding of a path description. The path description is a description of a path from the victim back to the attacker. The technique allows any path description to be revealed to the victim even when the number of header bits is one (i.e., b=1). In other words, this scheme uses only a single header bit, which is the minimum possible. This scheme assumes that $((2+\in)^{2n})$ packets is received by the victim, for any constant $\in > 0$, and is appropriate for small values of n. However, an information theoretic lower bound exists that demonstrates that $2^n$ packets are necessary for any one-bit protocol where the victim is able to determine the correct path with probability greater than ½.

The large number of packets required by one-bit protocols leads to a question of how the number of packets required to determine a traceback path decreases as the number of header bits (b) increases. The optimal number of packets that must be received (by the victim) for given values of n and b grows exponentially with n, but decreases doubly exponentially with b. Specifically, the PPM technique described herein provides a protocol that requires only $bn^2 2^b(2+\in)^{4n/2^b}$ packets, for any constant $\in$, to reconstruct a traceback path. There is also an information theoretic lower bound showing that $(2^b 2^{n/x})$ packets, where $x=2^b$, are necessary for the victim to be able to determine the correct path with a probability greater than ½.

Figure 2:
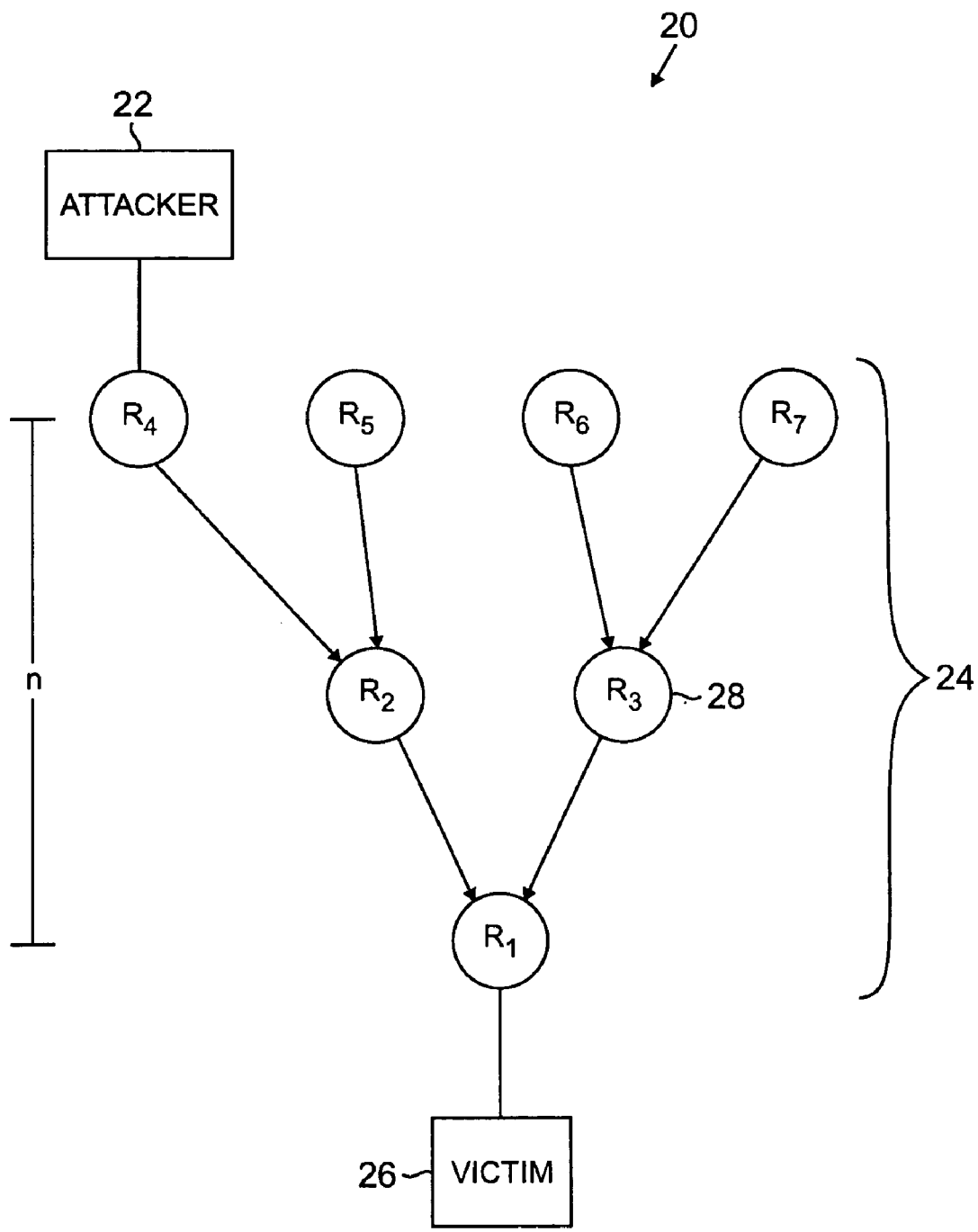
FIG. 2 is a network system as a binary tree showing an attacker using a single path.

Referring to FIG. 2, a network system 20 for forming a traceback path to an attacker 22 using a single path of attack includes a network of nodes 24 and a victim 26. Victim 26, for example, is a host server. The network of nodes 24, for example, represents routers. On the Internet, a router is a device that determines the next network point to which a packet should be forwarded toward its destination. From a perspective of victim 26, a routing topology of network 24 is an inverted binary tree with a height, n, where the victim 26 forms an additional node connected to the bottom of the tree. Thus, any packet sent to victim 26 from attacker 22 travels down the tree until the packet reaches victim 26. At the start of an attack, attacker 22 chooses the network of nodes 24 of the tree, and then for each packet, it determines which of these nodes 24 sends that packet to the victim 26.

In this example, when the packet is sent to a node 28, that node 28 is able to distinguish from which child of the node the packet came. For example, router $R_1$ has $R_2$ and $R_3$ as children and $R_2$ has $R_4$ and $R_5$ as children. Also, in this example, victim 26 has complete knowledge of the network topology.

This example is a simplified model for describing how the coding technique actually works. By using a rather abstract and simple model, the coding technique is described much more simply. Below, the model is extended to examples like the Internet.

The header of each packet contains b bits that are allocated to traceback information. For the purposes of describing the protocol, it is assumed that each packet includes only these bits. For each packet that is forwarded from attacker 22 to victim 26, the attacker 22 sets the initial value of these bits, and then each of the nodes in the network of nodes 24 is allowed to alter the bits, but no other communication occurs. In this example, the protocols used do not require any state information (memory) at the intermediate nodes. Thus, the intermediate nodes do not recall anything about the past packet traffic. Due to the memory-less nature of Internet routing, there is no storage. Thus, for each node, the set of b-bit that a node forwards to its parent in the tree can only be a function of the incoming b-bits, which child of that node the packet arrives from, and random bits (that are not remembered).

For a given placement of attacker 22 at a leaf of the tree, any node on the path from the root to the attacker at distance i from the root is represented as $N_i$ (where victim 26 is $N_0$, and the attacker is $N_{n+1}$). The path is represented as a binary string:

$$B = B_1 B_2 \ldots B_n$$

where $B_i=0$ if the path goes to the left child of $N_i$, and $B_i=1$, otherwise. When determining the outgoing bits for any packet, node $N_i$ has access to one bit of the string B: the bit $B_i$.

The intermediate nodes inform victim 26 of the string B by encoding B into the header of the packet. If attacker 22 chooses a node that is not a leaf of the tree, it may be able to set the initial bits of the packets in such a manner that it exactly simulates what would occur if one of the children of the chosen node were sending the packets. In other words, the path would look like it extends beyond its actual source.

In the case where b=1, the idea behind the protocol is to encode the string B into p, the probability that the bit received by the victim is a 1. For example, consider the encoding where $p = \Sigma B_i (½)^i$ for i=1 . . . n. With such an encoding, if victim 26 receives enough packets to determine the bias of p (with the required confidence) within an additive term of $(\frac{1}{2})^{n+1}$, then it is able to determine all n-bits of the binary string B. All the protocols described herein uses variations on the kind of encoding to transmit information to the victim 26.

For example, consider any set of bits $B_1 \ldots B_L$ and any protocol where the victim 26 is able to determine real numbers p, σ, and $c_1 \ldots c_L$, that satisfy the following conditions: $|p - \Sigma^L_{j=1} c_j B_j| \leq \sigma$, for all i, $1 \leq i \leq L-1$, $c_i > 2\sigma + \Sigma^L_{i+1} c_j$, and $C_L > 2\sigma$. Then, victim 26 can efficiently and uniquely determine the bits $B_1 \ldots B_L$.

Let DECODE(p, σ, $c_1, \ldots, c_L$) be the result of performing this decoding using the real numbers p, σ, and $c_1, \ldots, c_L$. The encoding (described above) where $c_i = (\frac{1}{2})^i$ can be achieved if it is assumed that the attacker 22 always sets the initial bit to 0. However, if the attacker 22 is allowed to set the initial value arbitrarily, then the resulting protocol does not quite uniquely specify the encoded string. Specifically, the attacker 22 can make lexicographically adjacent strings encode to the same probability. Thus, the encoding uses $c_i = (r^{i-1}/2)$, for $r = \frac{1}{2} - \epsilon$, for any $\epsilon$ such that $0 < \epsilon < \frac{1}{2}$. To achieve such an encoding scheme using only one-bit packets, what any node $N_i$ does on the receipt of a packet from its neighbor is described. Note that there are only four possible inputs for the node $N_i$, differentiated by the bit $B_i$ and the bit that $N_i$ receives from node $N_{i+1}$. The following table describes the probability that $N_i$ forwards a 1 to node $N_{i-1}$ on the four possible inputs:

|       | Incoming bit |                  |
| ----- | ------------ | ---------------- |
| $B_i$ | 0            | 1                |
| 0     | 0            | $\frac{1}{2} - \epsilon$ |
| 1     | $\frac{1}{2}$ | $1 - \epsilon$   |

Otherwise, in all four cases, $N_i$ forwards a 0. The victim 26 uses the following decoding process:

Obtain $F = \Theta((1/\epsilon r^n)^2 \log(1/\Delta))$ packets.

Let x be the number of is in this set of packets, and let $p = x/F - r^n/2$.

Let $\sigma = r^n/2 + \epsilon r^n$.

Set the bits $B_1 \ldots B_n$ according to the process DECODE (p, σ, $\frac{1}{2}$, r/2, $r^2/2, \ldots, r^{n-1}/2$).

This protocol is called a Single-Bit protocol. With a probability of $1-\Delta$, the Single Bit protocol allows the victim 26 to determine the correct values of $B_1 \ldots B_n$.

The description, thus far, requires a number of packets that is exponential in n, which for the case where b=1, such a dependence is necessary. However, since the protocol is impractical for all but small values of n, larger value of b are used. Thus, the process extends the one bit scheme to the case where b>1. In fact, it is possible to obtain a doubly exponential decrease in the number of packets required as b increases. To do so, the nodes of the path are portioned into $d = 2^{b-1}$ sets, numbered 0 to d-1, where node $N_i$ is in the set i mod d. Each of these sets performs the one-bit protocol (almost) independently, thereby decreasing the effective length of the path encoded using the one-bit protocol by a factor of d. The doubly exponential improvement comes from the fact that the number of packets required grows exponentially with n, and the effective value of n is decreased by a factor that is exponential in b.

To illustrate how to develop this into a valid protocol, consider an idealized scenario, where for every packet, the attacker 22 sets the initial b bits by choosing a random sample from the uniform distribution over all $2^b$ possible settings. The b bit positions in the header are denoted as $h_0 \ldots h_{b-1}$. For the idealized setting in each packet, the nodes in one cell of the partition perform the one-bit protocol using the bit $h_0$. The remainder of the bits is used as a counter to specify which cell of the partition participates in the one-bit protocol. In particular, for a packet P, let $I_i^P$ be the integer corresponding to the binary representation of the bits $h_1 \ldots h_{b-1}$ that are received at node $N_i$. Thus, node i sets $(I_{i-1})^P = j$ to mean that on packet P, the bits $h_1 \ldots h_{b-1}$ sent from node $N_i$ to node $N_{i-1}$ are set to the binary representation of j.

Each node Ni performs the following protocol for each packet P. If $I_i P = 0$, then the one-bit protocol is performed using the received bit $h_0$. $h_0$ is forwarded as the resulting bit of the one-bit protocol, and $(I_{i-1})^P$ is set equal to 1. Otherwise, $h_0$ is forwarded unchanged, and $(I_{i-1})^P$ is set equal to $I_i^P + 1$ mod d. For each possible setting of the initial bits by the attacker, only one cell of the partition participates in the one-bit protocol. Let $t_k$ be the number of packets received that are involved in the one-bit protocol for cell k of the partition. If the total number of packets received is $\Theta(d(1/\epsilon r^{n/d})^2 \log(d/\Delta))$, then as long as n>>d, $t_k \geq \Theta(d(1/\epsilon r^{n/d})^2 \log(d/\Delta))$ with probability at least $1-\Delta/d$. This result follows from a Chernoff bound. For this value of $t_k$, the effect is the same as performing the one-bit protocol on a path of length n/d. Thus, the victim 26 is able to reconstruct all of the bits in cell k of the partition with probability $1-\Delta/d$, and hence is able to reconstruct all of the bits with probability $1-\Delta$.

To make this procedure work for the attacker 22 that is allowed to set the initial bits arbitrarily, the protocol is modified slightly. Otherwise, the attacker 22 could, for example, set the initial bits to the same value for every packet, which would only inform the victim 26 of the bits in one cell of the partition. The change to the protocol is such that with a probability p (which can be any probability such that $\rho \neq 0$ and $\rho \neq 1$, but ideally $\rho = 1/n$), each node $N_i$ performs what is called a reset, i.e., it ignores the incoming bits completely, and sets $(I_{i-1})^P = 1$. Bit $h_0$ is forwarded as $B_i$ with probability $\frac{1}{2}$ and as 0 otherwise. This has the effect of resetting the counter with some probability, thereby allowing the bits from every partition to be sent to the victim 26.

With this more powerful attacker 22, a more complicated decoding procedure is developed. An expression is developed for the probability that a packet has $h_0$ set to 1 when it arrives at $N_0$. Let $(v_k)^n$ be the probability that a packet P is reset by some node between $N_n$ and $N_1$, inclusive, and $I_0^P = k$. If z(n,k) is the number of integers i, $1 \leq i \leq n$, such that i mod d=k, $v_k^n = \Sigma \rho(1-\rho)^{(j-1)d+k-1}$ for j=1 to z(n,k). Also, let $\alpha_j^k$ be the probability that a packet that arrives at $N_0$ is reset last by some node between $N_n$ and $N_{k+(j-1)d}$, given that it is reset by some node between $N_n$ and $N_1$, and that $I_0 P = k$. From Bayes rule, $\alpha_j^k = (1/v_k^n) \Sigma \rho(1-\rho)^{(t-1)d+k-1}$ for t=j to (n, k) Let $P_k$ be the set of packets P such that $I_0^P = k$. For $0 \leq k \leq d-1$, let $q_k^n$ be the fraction of packets in $P_k$ such that no node between $N_1$ and $N_n$ (inclusive) performs a reset on the packet. Note that $q_k^n$ is not a value readily available to the victim 26; an important portion of the decoding procedure is computing for each k a value $q'_k^n$ that serves as an estimate for $q_k^n$. Consider a packet chosen uniformly at random from the set of packets in $P_k$ for which the attacker 22 sets $h_0 = t$, for t ∈ {0,1}. The probability that the packet has ho set to 1 when it arrives at $N_0$ is $$P_k^t = t \cdot q_k^n r^{z(n,k)} + \Sigma B_{k+(j-1)d}(q_k^n + (1-q_k^n)\alpha_j^k)(r^{j-1}/2) \text{ for } j=1 \text{ to } z(n,k).$$

Thus, if it is known exactly the values $q_k^n$, the decoding process would not be very different from the single bit protocol. However, without at least a fairly accurate estimate for $q_k^n$, such a decoding process would not be able to determine the string B uniquely. In the case described below, the value of n is known. However, the same process applies for any value of $L \leq n$ determined by the victim 26, i.e., the victim 26 can decode any prefix of the path up to the attacker 22. The description here describes the simpler case of the decoding process where $\rho = 1/n$. The procedure works as follows:

$N_0$ waits until it has received
$F = ((48e^2/\rho r^{(n/d)})^2 (4ed/n\rho) \ln(4d/\Delta))$ packets.

For $0 \leq k \leq d-1$, $j \in \{0,1\}$, let $f_k^j$ be the total number of packets in $P_k$ for which the value of the bit ho received at $N_0$ is j. Note that $F = \Sigma (f_k^1 + f_k^0)$ for $k = 0 \ldots (d-1)$.

Let $q'_k^n = (f_k^1 + f_k^0 - v_k^n \cdot F)/(f_k^1 + f_k^0)$. Note that $q'_k$ is an estimate of the fraction of the packets arriving at $N_0$ with $I(h_1 \ldots h_{b-1}) = k$, such that no node between $N_1$ and $N_n$ (inclusive) performs a reset on the packet.

For $k = 0$ to $d-1$:
For $j=1$ to $z(n,k)$, let $c_j^k = (q'_k^n + (1-q'_k^n)\alpha_j^k)(r^{j-1}/2)$
Let $\sigma_k = (q'_k^n + (1-q'_k^n)(\alpha_{z(n,k)})^k)(r^{z(n,k)}/2)$
Let $\rho_k = (f_k^1/(f_k^1 + f_k^0)) - (q'_k^n (r^{z(n,k)}/2))$
Set the bits $B_t$, for $t = k + (j-1)d$, $1 \leq j \leq z(n,k)$, according to the process DECODE($p_k, \sigma_k, c_1^k, \ldots, (c_{z(n,k)})^k$).

The resulting combination of the encoding procedure at the nodes and the decoding procedure at the victim is called a Multi-bit protocol. Note that in the case that $p = \Theta(1/n)$, the number of packets required by the Multi-bit protocol is $O((xn^2/r^{4n/x})\ln(x/\Delta))$ where $x = 2^b$. If $2 \leq b \leq \log n$ and $\Delta \leq 1/8$, then with a probability of at least $1 - \Delta$, the Multi-bit protocol allows the victim to determine the correct values of $B_i$, $\forall i$, $1 \leq i \leq n$.

Figure 3:
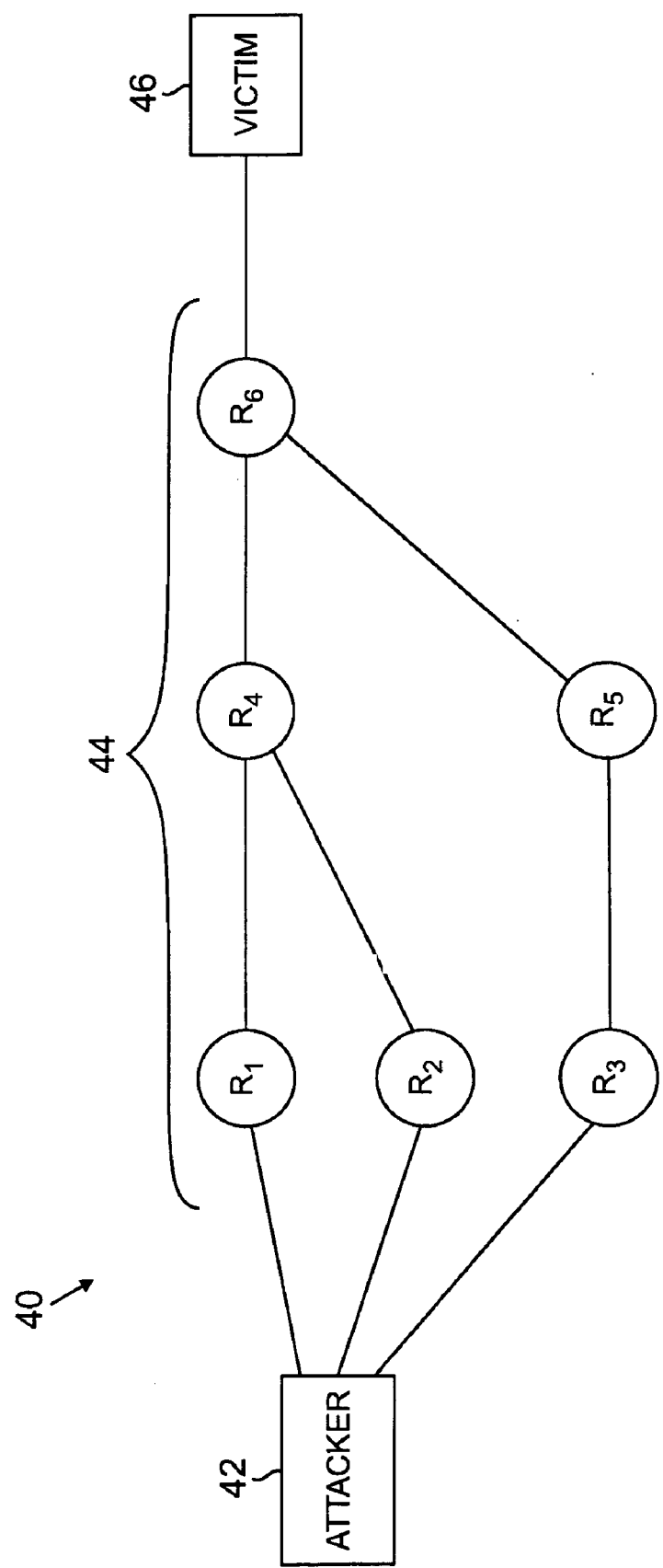
FIG. 3 is a network system showing an attacker using multi-paths.

Referring to FIG. 3, for the case of multiple paths of attack, one-bit protocols are not possible, no matter how many packets a victim 46 receives. In particular, let k represent the number of paths used by an attacker 42 in a network system 40 having a network of nodes 44 (e.g., routers $R_1$-$R_6$). A lower bound demonstrates that any correct protocol must use at least log(2 k−1) header bits, regardless of the number of packets received by the victim 46. For a restricted class of attacker strategies, log(2 k+1) bits are sufficient to generate a traceback path. The protocol described herein relies on an encoding technique that is based on utilizing Vandermonde matrices in coding, i.e., matrices having to do with fitting of polynomials or the reconstruction of distribution from their moments.

For protocols where the packets sent to the victim 46 travel on multiple paths, the same model as in the single path of attack is used (i.e., complete binary tree of height n and every node sees which child it receives any given packet from). In addition, a parameter k represents an upper bound on the number of paths of attack. It is assumed that at the start of the attack, the attacker 42 chooses a set of at most k nodes from a network of nodes 44, and then for each packet the attacker 42 sends, the attacker 42 chooses which of the k nodes sends that packet to the victim 46. A protocol works correctly as long as the attacker 42 chooses k or less paths of attack, but any behavior can result in the case that the attacker 42 uses more paths.

If the attacker 42 sends all but one of its packets along one path, for small values of b it is not possible for the victim to determine the path used by the single packet that takes a different path. Thus, a second parameter, a, is introduced where the parameter a represents the fraction of packets that must be sent along a path before the victim 46 can recover that path. In particular, a protocol is α-sensitive, if during any given attack, the victim 46 is able to reconstruct (with sufficiently high probability) all paths P, such that at least a fraction of α/k of the packets the attacker 42 sends travel along P. Note that protocols where α>1 are not of interest, since the attacker 42 could choose to send an equal number of packets along every path, in which case an a-sensitive protocol with α>1 would not be guaranteed to return any path information.

The assumption is made also that the attacker 42 sends each packet with the initial b header bits set to 0. The lower bounds also hold without this restriction, since the attacker 42 can always choose to do this. This assumption does restrict the applicability of the protocol introduced. However, protocols in this model are considered an important step towards a full solution. The technique for the multiple path protocol can be adapted to work for a number of different restrictions on the adversary (for example, it can be adapted to a model where the attacker 42 chooses the initial bits using a uniform or any other known distribution).

If there are two disjoint sets of paths $S_1$ and $S_2$ such that there is a convex combination of vectors representing the paths in $S_1$ that is equal to a convex combination of vectors representing the paths in $S_2$, then attacker 42 is able to hide in network 42. This protocol can encode an arbitrarily large set of paths in such a way that the resulting set of vectors has no such sets $S_1$ and $S_2$. In fact, the technique produces a set of vectors that satisfy a stronger criteria, i.e., that every set of 2 k vectors is linearly independent.

In order to do so, consider a curve in 2 k-dimensional space such that any set of 2 k distinct vectors with endpoints on this curve are linearly independent. With this encoding, the vector for every path lies on this curve. This curve is defined in terms of a parameter t. Let v(t) be the 2 k-dimensional vector such that the i-th component of v(t) is $t^i$. As in the case of a single path of attack, let any path P be described by bits $B_1(P) \ldots B_n(P)$, which specifies the entire path from the victim 46 to the attacker 42. To determine the path P, it is sufficient to determine the value $X_P = \Sigma_{i=1}^{2k} B_i(P)/2^i$ for $i = 1 \ldots 2$ k. To encode the path P, the probability distribution is used as defined by the vector $V(P) = v(\frac{1}{4}X_P)$. Note that this is a generalization of the encoding used for the k=1 case. To first demonstrate how to compute the vectors on this curve in a distributed fashion, b=log(2 k+1) is used, and thus, there are at least 2 k+1 possible headers. Only the 2 k+1 of these headers that represent the smallest integers are used (i.e., headers 0 through 2 k). Let $p_i(P)$ be the probability that a packet sent along path P arrives at the victim 46 with the header bits set to i. A protocol for each of the distributed network of nodes 44 is described such that $p_i(P) = (\frac{1}{4}(X_P))^i$, for i>0, and $p_0(P) = 1 - \Sigma p_i(P)$ where $i = 1 \ldots 2$ k. Let $(p_{i,j})^e$ be the probability that a node holding the bit e, for $e \in \{0,1\}$, forwards the header j when it receives the header i. Note that it must be the case that $\forall$ i,e, $\Sigma(p_{i,j})^e = 1$ where $i = 1 \ldots 2$ k. When a node holds the bit 0, the probability transitions are defined as follows:

For $0 < i \leq 2$ k, $P_{i,i} = 2^{-i}$, and $(p_{i,0})^0 = 1 - 2^{-i}$.
For $i \neq j$, and $j \neq 0$, $(p_{i,j})^0 = 0$.
$(P_{0,0})^0 = 1$.

When a node holds the bit 1, the probability transitions are defined as follows:

$$\text{For } 1 \leq i \leq j \leq 2k, (p_{i,j})^1 = 2^{2i-3j} \binom{j}{i} + 2^{-3j}.$$

For $1 \leq j < i \leq 2$ k, or $i = 0 < j \leq 2$ k, $(p_{i,j})^1 = 2^{-3j}$
For $j = 0 \leq i \leq 2$ k, $(P_{i,j})^1 = 1 - \Sigma(p_{i,j})^1$, where $j = 1 \ldots 2$ k For each possible header received by a node, this protocol defines a valid probability distribution over headers that the node forwards. In particular, $\forall$ i, j, and e, $0 \leq (p_{i,j})^e \leq 1$ and $\forall$ i and e, $\Sigma(p_{i,j})^e$, for $j = 0 \ldots 2$ k. For any path P and $1 \leq i \leq 2$ k $p_i(P) = (X_i/4)^i$. After the victim 46 has collected $6(48y2^{(2y+k)(n+2)})^2 \ln(2 \text{ k}/\Delta)$ packets, with a probability of at least $1-\Delta$, where $y = k^2$ the victim 46 is able to determine all paths P such that at least a fraction of $\alpha/k$ of the packets the attacker 42 sends travel along P.

In other examples the network of nodes 44 know the entire routing topology and the tree is binary, but the network of nodes 44 do not obtain the information of from which child they receive a given packet. In this example, the information that is reconstructed is slightly different. For example, instead of being able to reconstruct a path that contains the attacker 42, this smaller number of information only allows one to reconstruct a path such that the attacker 42 is a child of some node along that path. This model is a source-oblivious model, and the model described earlier in this description is a source-cognizant model. The two models are equivalent in the following sense, any protocol for the source-cognizant model for a tree of height n provides a protocol for the source oblivious model for a tree of height n−1. Any protocol for the source oblivious model for a tree of height n provides a protocol for the source cognizant model for a tree of height n+1.

To simulate a protocol for the source-cognizant model in the source-oblivious model, each node simply does exactly what its parent would do in the source cognizant model. Each node has enough information to do this. The parent of the attacker 42 follows the source oblivious protocol correctly, and this simulates the parent of the parent of the attacker 42 following the source cognizant protocol correctly. Thus, the path is followed correctly back to the parent of the attacker 42.

For the reverse simulation, each node N does exactly what its child $N_c$ on the path would do in the source oblivious protocol on receiving the bits that N receives. In the case that $N_c$ is actually the attacker 42, the node N simulates what $N_c$ would do if it were not the attacker 42, but a child of $N_c$ were the attacker 42. Since the node N has the information of which child it receives a packet from, N has enough information to perform such a simulation. This gives the source cognizant protocol the ability to obtain a path that contains the attacker 42.

In other examples, the simple model is extended to cover the Internet. In these examples, neither the victim 46 nor the routers ($R_1$-$R_6$) have any information about the network topology, nor does a router see the information of which child sends it a packet. Each router simply knows its own unique router ID, and the task is to inform the victim 46 of an n-bit string that represents the concatenation of the unique IDs of the routers along the path of attack. These IDs might, for example, correspond to IP addresses. To use any of the protocols for the upper bound model in such a scenario, each router, on receiving a b-bit packet from a preceding router would simulate a complete binary tree of height k in the source oblivious model, where k is the length of its unique ID. The leaf of the tree that the router simulates receiving the packet is the leaf with a path description that is the same as the unique ID of the router. The overall string received by the victim 46 is the concatenation of the router IDs.

In still other embodiments, the victim 46 knows the entire routing topology, and also each node is able to see which child it receives a given packet from, but the underlying tree is not binary. For this model, one could use the same technique of using unique IDs for the routers along the path of attack, but instead a more efficient encoding of the path is presented. In particular, for every node N of the tree, the child of that node is the predecessor of N in the attacker's path of attack using a Shannon code where the distribution used in the code is the distribution over the children of N when a node of the subtree rooted at N is chosen uniformly at random.

The number of bits required to represent any path using this scheme is at most h+log m, where m is the number of nodes in the system, and h is the height of the tree. To use the protocol for the upper bound model to actually compute this encoding, consider some node on the path of attack with t children, and corresponding code words $C_1 \ldots C_t$. On a message received from child j, node simulates what would occur in the source cognizant model with a binary tree of height $|C_j|$ when the child specified by the path specified by $C_j$ receives a packet from the attacker 42. This provides a mechanism for encoding the string $C_j$.

Figure 4:
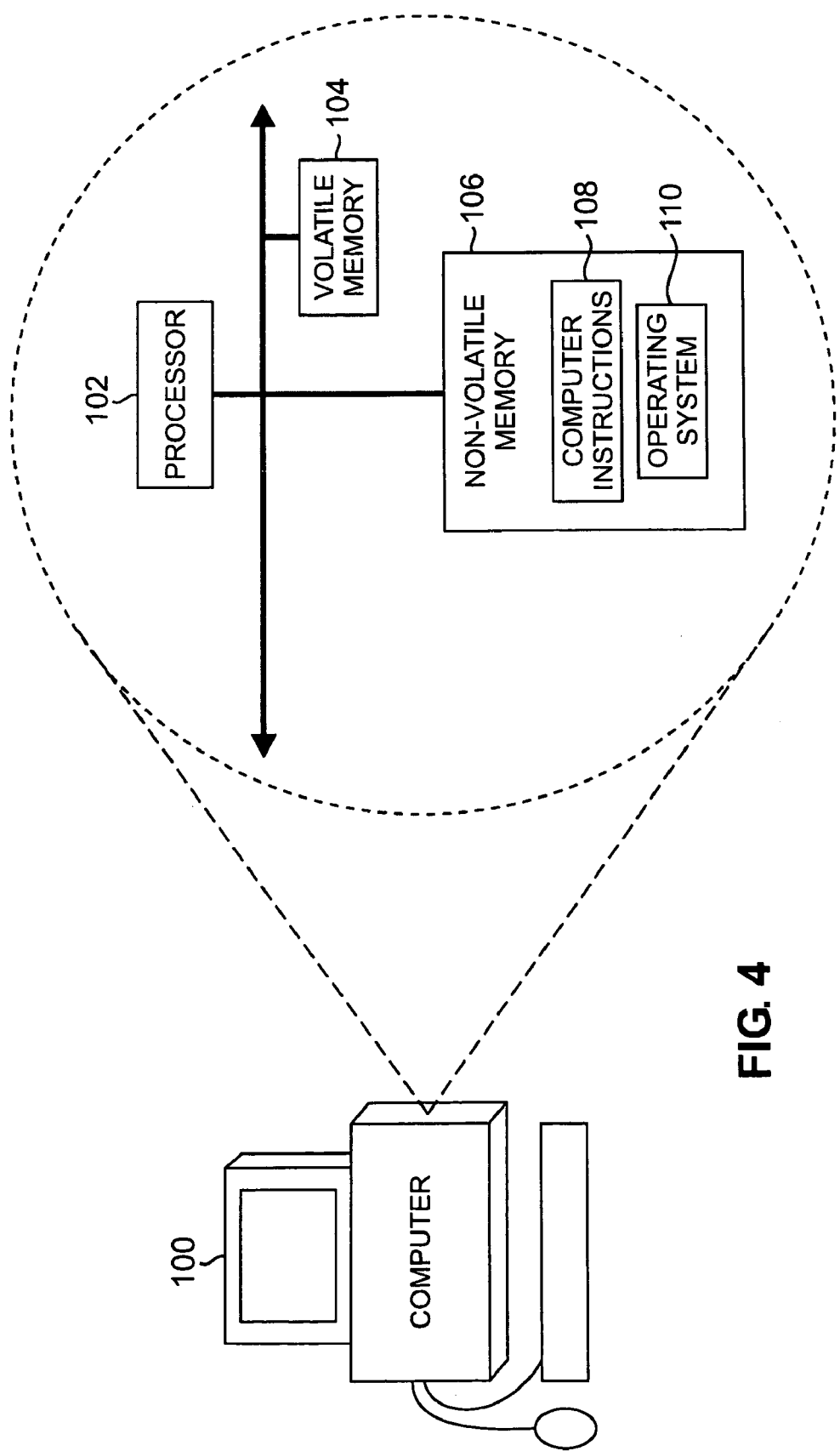
FIG. 4 is a block diagram of a system for performing the process of FIG. 1.

FIG. 4 shows a computer 100 for performing probabilistic packet marking using process 10. Computer 100 includes a processor 102, a memory 104, and a storage medium 106 (e.g., hard disk). Non-volatile 106 stores operating system 110 and computer instructions 108 which are executed by processor 102 out of volatile memory 104 to perform process 10.

Process 10 is not limited to use with the hardware and software of FIG. 4; it may find applicability in any computing or processing environment and with any type of machine that is capable of running a computer program. Process 10 may be implemented in hardware, software, or a combination of the two. For example, process 10 may be implemented in a circuit that includes one or a combination of a processor, a memory, programmable logic and logic gates. Process 10 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 10 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform process 10. Process 10 may also be implemented as a machine-readable storage medium, configured with a computer program, where upon execution, instructions in the computer program cause the computer to operate in accordance with process 10.

The process is not limited to the specific processing order of FIG. 1. Rather, the blocks of FIG. 1 may be re-ordered, as necessary, to achieve the results set forth above.

Other embodiments not described herein are also within the scope of the following claims.

What is claimed is:

1. A method for determining a traceback path in a network, the method comprising:
   receiving packets sent from a source system to a destination system using a single path, the packets including Internet Protocol (IP) traceback information encoded using 1 bit located in a packet header, the IP traceback information including information on an IP traceback path back to the source system; and
   determining the IP traceback path after a determined number of packets are received by the destination system, wherein the determined number of packets is a function of $(2+\epsilon)^{2n}$ packets, where n is a number of bits used to describe the IP traceback path, and where $\epsilon$ is a constant greater or equal to 0.

2. A method for determining a traceback path in a network, method comprising:
   receiving packets sent from a source system to a destination system using a single path, the packets including Internet Protocol (IP) traceback information encoded using b bits located in a packet header, the IP traceback information including information on an IP traceback path back to the source system; and
   determining at least some of the (IP) traceback path after a determined number of packets are recieved by the destination system, wherein b>1 and the determined number of packets is a function of $bn^2 2^b (2+\epsilon)^{4n/x}$, where x is equal to $2^b$ and where $\epsilon$ is a constant greater than zero, and n is a number of bits used to describe the IP traceback path.

3. A method for determining traceback paths in a network, the method comprising:
   receiving packets sent from a source system to a destination system using multiple paths, the packets including Internet Protocol (IP) traceback infromation encoded using b bits located in a packet header, the IP traceback information including information on IP traceback paths back to the source system; and
   determining the IP traceback paths after a determined number of packets are recieved by the destination system, wherein b bits is equal to log(2 k+1), wherein k is the number of paths used by the source system.

4. An apparatus for determining a traceback path in a network, the apparatus comprising:
   a memory that stores executable instructions; and
   a processor that executes the instructions to:
   receive packets sent from a source system to a destination system using a single path, the packets including Internet Protocol (IP) traceback information encoded using 1 bit located in a packet header, the IP traceback information including information on an IP traceback path back to the source system; and
   determine the IP traceback path after a determined number of packets are received by the destination system, wherein the determined number of packets is a function of $(2+\epsilon)^{2n}$ packets where n is a number of bits used to describe the IP traceback path and where $\epsilon$ is a constant greater or equal to 0.

5. An apparatus for determining a traceback path in a network, the apparatus comprising:
   a memory that stores executable insructions; and
   a processor that executes the instructions to:
   receive packets sent from a source system to a destination system using a single path, the packets including Internet Protocol (IP) traceback information encoding using b bits located in a packet header, the IP traceback information including information on an IP traceback path back to the source system; and
   determine the IP traceback path after a determined number of packets are received by the destination system, wherein b>1 and the determined number of packets is a function of $bn^2 2^b (2+\epsilon)^{4n/x}$, where x is equal to $2^b$ and where $\epsilon$ is a constant greater than zero, and n is a number of bits used to describe the IP traceback path.

6. An apparatus for determining traceback paths in a network, the apparatus comprising:
   a memory that stores executable instructions; and
   a processor that executes the instructions to:
   receive packets sent from a source system to a destination system using multiple paths, the packets including Internet Protocol (IP) traceback information encoded using b bits located in a packet header, the IP traceback information including information on IP traceback paths back the source system; and
   determine at least some of the IP traceback paths after a determined number of packets are received by the destination system, wherein b bits is equal to log(2 k+1) wherein k is the number of paths used by the source system.

7. The method of claim 1, wherein determining the IP traceback path comprises:
   determining a probabilty value based on the value of the encoded IP traceback information bit in the determined number of received packets.

8. The method of claim 7, wherein determining the IP traceback path further comprises:
   representing the determined probability value as a binary message, the binary message being representative of the IP traceback path.

9. The method of claim 1, wherein the encoded IP traceback information in each of the recieved packets is based on data associated with one or more intermediate systems through which the received packets passed before being received at the destination system.

10. The method of claim 2, wherein determining the IP traceback path comprises:
    determining a probability value based on the values of the encoded IP traceback information bits in the determined number of received packets.

11. The method of claim 10, wherein determining the IP traceback path further comprises:
    representing the determined probability value as a binary mesaage, the binary message being representative of the IP traceback path.

12. The method of claim 2, wherein the encoded IP traceback information in each of the received packets is based on a data portion held in one of a plurality of subsets holding data associated with one of one or more intermediate systems through which the received packets passed before being received at the destination system, and information identifying the one of the plurality of subsets.

13. The method of claim 3, wherein determining the IP traceback paths comprises:
    determining a probability value based on the values of the encoded IP traceback information bits in the determined number of received packets.

14. The method of claim 13, wherein determining the IP traceback paths further comprises:
  representing the determined probability value as a binary message, the binery message being representative of the IP traceback paths.

15. The method of claim 3, wherein the encoded IP traceback information in each of the received packets is based on a data portion held in one of a plurality of subsets holding data associated with one of one or more intermediate systems through which the received packets passed before being received at the destination system, and information identifying the one of the plurality of subsets.

16. The apparatus of claim 4, wherein the instructions that cause the processor to determine the IP traceback path comprise instructions that cause the processor to:
  determine a probability value based on the values of the encoded IP traceback informabon bit in the determined number of received packets.

17. The apparatus of claim 16, wherein the instructions that cause the processor to determine the IP traceback path further comprise instructions that cause the processor to:
  represent the determined probability value as a binary message, the binary message being representative of the IP traceback path.

18. The apparatus of claim 5, wherein the instructions that cause the processor to determine IP traceback path comprise instructions that cause the processor to:
  determine a probability value based on the values of the encoded IP traceback information bits in the determined number of received packets.

19. The apparatus of claim 18, wherein the instructions that cause the processor to determine the IP traceback path further comprise instructions that cause the processor to:
  representing the determined probability value as a binary message, the binary message being representative of the IP traceback path.

20. The apparatus of claim 6, wherein the instructions that cause the processor to determine IP traceback paths comprise instructions that cause the processor to:
  determine a probability value based on the values of the encoded IP traceback information bits in the determined number recieved packets.

21. The apparatus of claim 20, wherein the instructions that cause the processor to determine the IP traceback paths further comprise instructions that cause the processor to:
  represent the determined probability value as a binary message, the binary message being representative of the IP traceback paths.

22. A server for probabilistic packet marking in a network, the server comprising:
  a processor; and
  a memory that stores executable instructions that when executed cause the processor to:
    recieve one or more packets sent from a source system to a destination system using a single path, the one or more received packets including Internet Protocol (IP) traceback information encoded using 1 bit located in a packet header of each of the one or more packets, the IP traceback information including information configured to enable determination of an IP traceback path from the destination system back to the source system; and
    encode into the 1 bit information such that the IP traceback path can be determined at the destination system based on a number of packets received at the destination system that is a function $(2+\epsilon)^{2n}$ packets, where n is a number of bits used to describe the IP traceback path, and where $\epsilon$ is a constant gteater or equal to 0, wherein the encoded information is based, at least in part, on data associated with the server.

23. The server of claim 22, wherein the received one or more packets each include a corresponding old value encoded into the 1 bit located in the packet header, and wherein the instructions that cause the processor to encode into the 1 bit the information comprise instructions that cause the processor to replace the corresponding old value with the encoded information.

24. The server of claim 23, wherein the encoded information is further based, at least in part, on the old value.

25. A server for probabilistic packet marking in a network, the server comprising:
  a processor; and
  a memory that stores executable instructions that when executed cause the processor to:
    receive one or more packets sent from a source system to a destination system using a single path, the one or more received packets including Internet Protocol (IP) traceback information encoded using b bits located in a packet header of each of the. one or more packets, the IP traceback information including information configured to enable determination of an IP traceback path from the destination system back to the source system; and
    encode into the at least one of the b bits of each of the one or more packets information such that the traceback path can be determined at the destination system based on a number of packets received at the destination system that is a function or $bn^2 2^b (2+\epsilon)^{4n/x}$ packets, where b>1, x is equal to $2^b$, $\epsilon$ is a constant greater than zero, and n is a number of bits used to describe the IP traceback path, wherein the encoded information is based, at least in part, on a data portion held in one of a plurality of subsets hoiding data associated with the server; and
    encode into the remaining bits of the b bits information identifying the one of the plurality of subsets.

26. The server of claim 25, wherein the recieved one or more packets each include a corresponding first old value encoded into the at least one of the b bits, and wherein the instructions that cause the processor to encode into the at least one of the b bits of each of the one or more packets the information comprise instructions that cause the processor to replace the corresponding first old value with the encoded information.

27. The server of claim 26, wherein the received one or more packets each include a corresponding second old value encoded into the remaining bits of the b bits, the corresponding second old value corresponding to information identifying a subset holding a data portion associated with a predecessor server, and wherein the instructions that cause the processor to encode into the remaining bits of the b bits the information identifying the one of the plurality of subsets comprise instructions that cause the processor to:
  select the one of the plurality of subsets based on the occurrence ot a probabilistic event, the identity of the one of the plurality of subsets being different from the identity of the subset identified by the corresponding second old value.

28. The server of claim 26, wherein the encoded information is further based, at least in part, on the corresponding first old value.

29. A server for probabilistic packet marking in a network, the server comprising:

a processor; and a memory that stores executable instructions that when executed cause the processor to:

recieve one or more packets sent from a source system to a destination system using multiple paths, the one or more recieved packets including Internet Protocol (IP) traceback information encoded using b bits located in a packet header of each of the one or more packets, the IP traceback information including information configured to enable determination of IP traceback paths from the destination system back to the source system; and encode into the at least one of the b bits of each the one or more packets information such that the IP traceback paths can be determined at the destination system based on a number of packets received at the destination system, wherein b bits is equal to log(2 k+1), wherein k is the number of paths used by the source system, and wherein the encoded information is based, at least in part, on a data portion held in one of a plurality of subsets holding data associated with the server; and encode into the remaining bits of the b bits infprmation identifying the one of the plurality of subsets.

30. The server of claim 29, wherein the received one or more packets each include a corresponding first old value encoded into the at least one of the b bits, and wherein the instructions that cause the processor to encode into the at least one of the b bits of each of the one or more packets the information comprise instructions that cause the processor to replace the corresponding first old value with the encoded information.

31. The server of claim 30, wherein the received one or more packets each include a corresponding second old value encoded into the remaining bits of the b bits, the corresponding second old value corresponding to information identifying a subset holding a data portion associated with a predecessor server, and wherein the instructions that cause the processor to encode into the remaining bits of the b bits the information identifying the one of the plurality of subsets comprise instructions that cause the processor to:

select the one of the plurality of subsets based on the occurrence of a probabilistic event, the identity of the one of the plurality of subsets being different from the identity of the subset identified by the corresponding second old value.

32. The server of claim 30, wherein the encoded information is further based, at least in part, on the corresponoing first old value.

33. A method for probabalistic marking in a network, the method comprising:

receiving one or more packets sent from a source system to a destination system using a single path, the one or more received packets including Internet Protocol (IP) traceback information ecoded using 1 bit located in a packet header of each of the one or more packets, the IP traceback information including information configured to enable determination of an IP traceback path from the destination system back to the source system; and encoding into the 1 bit information such that the IP traceback path can be determined at the destinatton system based on a number of packets received at the destination system that is a function of $(2+\epsilon)^{2n}$ packets, where n is a number of bits used to describe the IP traceback path, and where $\epsilon$ is a constant greater or equal to 0, wherein the encoded information is based, at least in part, on data associated with the server.

34. The method of claim 33, wherein the received one or more packets each include a corresponding old value encoded into the 1 bit located in the packet header, and wnerein encoding into the 1 bit the information comprises replacing the corresponding old value with the encoded information.

35. The method of claim 34, wherein the encoded information is further based, at least in part, on the old value.

36. A method for probabilistic packet marking in a network, the method comprising:

receiving one or more packets sent from a source system to a destination system using a single path, the one or more received packets including Internet Protocol (IP) traceback information encoded using b bits located in a packet header of each of the one or more packets, the IP traceback information inclding information configured to enable determination of an IP traceback path from the destination system back to the source system; and encoding into the at least one of the b bits of each of the one or more packets information such that the IP traceback path can be determined at the destination system based on a number of packets received at the destination system that is a function of $bn^2 2^b (2+\epsilon)^{4n/x}$ packets, where b>1, x is equal to $2^b$, $\epsilon$ constant greater than zero, and n is a number of bits used to describe the IP traceback path, wherein the encoded information is based, at least in part, on a data portion held in one of a plurality of subsets holding data associated with the server; and encoding into the remaining bits of the b bits information identifying the one of the plurality of subsets.

37. The method of claim 36, wherein the received one or more packets each include a corresponding first old value encoded into the at least one of the b bits, and wherein encoding into the at least one of the b bits of each of the one or more packets the information comprises replacing the corresponding first old value with the encoded information.

38. The method of claim 37, wherein the received one or more packets each include a corresponding second old value encoded into the remaining bits of the b bits, the corresponding second old value corresponding to information identifying a subset holding a data portion associated with a predecessor server, and wherein encoding into the remaining bits of the b bits the information identitfying the one of the plurality of subsets comprises selecting the one or the plurality of subsets based on the occurrence of the probabilistic event, the identity of the one of the plurality of subsets being different from the identity of the subset identified by the corresponding second old value.

39. The method of claim 37, wherein the encoded information is further based, at least in part, on the corresponding first old value.

40. A method for probabilistic packet marking in a network, the method comprising:

receiving one or more packets sent from a source system to a destination system using multiple paths, the one or more received packets including Internet Protocol (IP) traceback infomation encoded using b bits located in a packet header of each of the one or more packets, the IP traceback information including information configured to enable determination of IP traceback paths from the destination system back to the source system; and encoding into the at least one of the b bits of each of the one or more packets information such that the IP traceback paths can be determined at the destination system based on a number of packets received at the destination system, wherein b bits is equal to log(2 k+1), wherein k is the number of paths used by the source system, and wherein the encoded information is based, at least in part, on a data portion held in one of a plurality of subsets holding data associated with the server; and encoding into the remaining bits of the b bits information identifying the one of the plurality of subsets.

41. The method of claim 40, wherein the received one or more packets each include a corresponding first old value encoded into the at least one of the b bits, and wherein encoding into the at least one of the b bits of each of the one or more packets the information comprises replacing the corresponding first old value with the encoded information.

42. The method of claim 41, wherein the received one or more packets each include a corresponding second old value encoded into the remaining bits ot the b bits, the corresponding second old value corresponding to information identifying a subset holding a data potion associated with a predecessor server, and wherein encoding into the remaining bits of the b bits the information identifying the one of the plurality of subsets comprises selecting the one of the plurality of subsets based on the occurence of a probabilistic event, the identity of the one of the plurality of subsets being different from the identity of the subset identified by the corresponding second old value.

43. The method of claim 41, wherein the encoded information based at least on part, on the corresponding first old value.

* * * * *